US012633146B2

(12) United States Patent
Lionar et al.

(10) Patent No.: US 12,633,146 B2
(45) Date of Patent: May 19, 2026

(54) CONNECTING VISION AND LANGUAGE USING FOURIER TRANSFORM

(71) Applicant: SAP SE, Walldorf (DE)

(72) Inventors: Stefan Lionar, Singapore (SG); Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 504 days.

(21) Appl. No.: 17/967,945

(22) Filed: Oct. 18, 2022

(65) Prior Publication Data

US 2024/0127616 A1    Apr. 18, 2024

(51) Int. Cl.
| | |
|---|---|
| *G06V 30/186* | (2022.01) |
| *G06F 40/284* | (2020.01) |
| *G06T 3/40* | (2024.01) |
| *G06T 9/00* | (2006.01) |
| *G06V 30/166* | (2022.01) |
| *G06V 30/18* | (2022.01) |
| *G06V 30/19* | (2022.01) |

(52) U.S. Cl.
CPC .......... *G06V 30/187* (2022.01); *G06F 40/284* (2020.01); *G06T 3/40* (2013.01); *G06T 9/00* (2013.01); *G06V 30/166* (2022.01); *G06V 30/1801* (2022.01); *G06V 30/19193* (2022.01)

(58) Field of Classification Search
CPC .............. G06V 30/187; G06V 30/166; G06V 30/1801; G06V 30/19193; G06F 40/284; G06T 3/40; G06T 9/00
See application file for complete search history.

(56) References Cited

U.S. PATENT DOCUMENTS

| | | | |
|---|---|---|---|
| 12,190,060 B1 * | 1/2025 | Tavanaei | G06F 40/169 |
| 2020/0311798 A1 * | 10/2020 | Forsyth | G06N 3/04 |
| 2021/0081662 A1 * | 3/2021 | Goyal | G06V 30/416 |
| 2022/0093088 A1 * | 3/2022 | Rangarajan Sridhar | |
| | | | G06F 16/338 |
| 2023/0110114 A1 * | 4/2023 | Reddy | G06T 3/40 |
| | | | 345/660 |

(Continued)

FOREIGN PATENT DOCUMENTS

KR    20230154565 A  * 11/2023  .......... G06T 7/0004

OTHER PUBLICATIONS

Bugliarello, E. et al. "Multimodal Pretraining Unmasked: A Meta-Analysis and a Unified Framework of Vision-and-Language BERTs." arXiv preprint arXiv:2011.15124 (2021).

(Continued)

*Primary Examiner* — Ross Varndell
*Assistant Examiner* — Justin Philip Cascais
(74) *Attorney, Agent, or Firm* — Mintz Levin Cohn Ferris Glovsky and Popeo, P.C.

(57)    ABSTRACT

A method for text-image integration is provided. The method may include receiving a question related to pairable data comprising text data and image data. Embeddings are generated from the text tokens and image encodings. Embeddings are generated from the text tokens and image encodings. The embeddings include text embeddings and image embeddings. A spectral conversion of the text embeddings and the image embeddings is performed to generate spectral data. The spectral data is processed to extract text-image features. The text-image features are processed to generate inferred answers to the question.

14 Claims, 4 Drawing Sheets

(56) References Cited

U.S. PATENT DOCUMENTS

2025/0030878 A1* 1/2025 Cho ...................... G06V 20/64

OTHER PUBLICATIONS

Chen, S. et al., "CycleMLP: A MLP-like Architecture for Dense Prediction," arXiv preprint arXiv:2107.10224, 2021.

Chen, Y.-C. et al., "UNITER: Learning UNiversal Image-TExt Representations," 2019.

Cooley, J. W. et al., "An Algorithm for the Machine Calculation of Complex Fourier Series," Mathematics of computation, 19(90):297-301, 1965.

Devlin, J. et al., "BERT: Pre-training of Deep Bidirectional Transformers for Language Understanding," In Proceedings of the 2019 Conference of the North American Chapter of the Association for Computational Linguistics: Human Language Technologies, vol. 1 (Long and Short Papers), pp. 4171-4186, 2019.

Dosovitskiy, A. et al., "An Image is Worth 16x16 Words: Transformers for Image Recognition at Scale," arXiv preprint arXiv:2010.11929, 2020.

Goyal, Y. et al., "Making the V in VQA Matter: Elevating the Role of Image Understanding in Visual Question Answering," In Proceedings of the IEEE Conference on Computer Vision and Pattern Recognition, pp. 6904-6913, 2017.

Huang, Z. et al., "Pixel-BERT: Aligning Image Pixels with Text by Deep Multi-Modal Transformers," arXiv preprint arXiv:2004.00849, 2020.

Huang, Z. et al., "Seeing Out of the box: End-to-End Pre-training for Vision-Language Representation Learning," In Proceedings of the IEEE/CVF Conference on Computer Vision and Pattern Recognition, pp. 12976-12985, 2021.

Kim, W. et al., "ViLT: Vision-and-Language Transformer Without Convolution or Region Supervision," arXiv preprint arXiv:2102.03334, 2021.

Krishna, R. et al., "Visual Genome: Connecting Language and Vision Using Crowdsourced Dense Image Annotations," International Journal of Computer Vision, 123(1):32-73, 2017.

Kudo, T. et al., "SentencePiece: A simple and language independent subword tokenizer and detokenizer for Neural Text Processing," arXiv preprint arXiv:1808.06226, 2018.

Lee-Thorp, J. et al., "FNet: Mixing Tokens with Fourier Transforms," arXiv preprint arXiv:2105.03824, 2021.

Li, J. et al., "Align before Fuse: Vision and Language Representation Learning with Momentum Distillation," arXiv preprint arXiv:2107.07651, 2021.

Lin, T.-Y. et al., "Microsoft coco: Common objects in context." In *European conference on computer vision*, pp. 740-755. Springer, 2014.

Liu, H. et al., "Pay Attention to MLPs," arXiv preprint arXiv:2105.08050, 2021.

Loshchilov, I. et al., "Decoupled Weight Decay Regularization," In International Conference on Learning Representations, 2018.

Lu, J. et al., "ViLBERT: Pretraining Task-Agnostic Visiolinguistic Representations for Vision-and-Language Tasks," 2019.

Ordonez, V. et al., "Im2Text: Describing Images Using 1 Million Captioned Photographs," Advances in neural information processing systems, 24, 2011.

Rao, Y. et al., "Global Filter Networks for Image Classification," arXiv preprint arXiv:2107.00645, 2021.

Ren, S. et al., "Faster R-CNN: Towards Real-Time Object Detection with Region Proposal Networks," Advances in neural information processing systems, 28, 2015.

Selvaraju, R.R. et al., "Grad-CAM: Visual Explanations from Deep Networks via Gradient-based Localization" In Proceedings of the IEEE international conference on computer vision, pp. 618-626, 2017.

Sharma, P. et al., "Conceptual Captions: A Cleaned, Hypernymed, Image Alt-text Dataset For Automatic Image Captioning," In Proceedings of the 56th Annual Meeting of the Association for Computational Linguistics (vol. I: Long Papers), pp. 2556-2565, 2018.

Suhr, A. et al., "A Corpus for Reasoning About Natural Language Grounded in Photographs," In Proceedings of the 57th Annual Meeting of the Association for Computational Linguistics, pp. 6418-6428, 2019.

Tolstikhin, I. et al., "MLP-Mixer: An all-MLP Architecture for Vision," arXiv preprint arXiv:2105.01601, 2021.

Touvron, H. et al., "ResMLP: Feedforward networks for image classification with data-efficient training," arXiv preprint arXiv:2105.03404, 2021.

Touvron, H. et al., "Training data-efficient image transformers & distillation through attention," In International Conference on Machine Learning. PMLR, 2021.

Xue, H. et al., "Probing inter-modality: Visual parsing with self-attention for vision-language pre-training," arXit, preprint arXiv:2106.13488, 2021.

* cited by examiner

*300*

Receive pairable data — *302*

Generate tokens — *304*

Generate embeddings — *306*

Perform spectral conversion — *308*

Generate results — *310*

Provide output based on results — *312*

CONNECTING VISION AND LANGUAGE USING FOURIER TRANSFORM

TECHNICAL FIELD

The subject matter described herein relates generally to deep learning models and more specifically to usage of a Fourier sublayer to incorporate information from image and text domains for assisting one or more software applications.

BACKGROUND

The progress in deep learning has resulted in great advances in computer image and natural text processing. These advances have created significant interests in pushing forward deep learning's capability to deal with concept comprehension and reasoning by the integration of image and text. Many real-world applications are based on integration of image and text, such as answering questions in natural text given an image, human-computer interaction and image retrieval. The modern deep learning models for image and text tasks mostly utilize self-attention sublayers to integrate the information from image and text modalities. Self-attention sublayers have increasing quadratic time and memory complexities to the length and resolution of input texts and images. Besides, self-attention sublayers introduce a lot of trainable parameters that result in a non-compact model. The inefficiencies of self-attention sublayers pose problems when the image-text model is to be deployed in edge devices with no access to a supercomputer or machines with limited computational capacity. Quadratic complexity of self-attention sublayers can exhaust processing capabilities and memory limits when processing long text sequences and high resolution images.

SUMMARY

Systems, methods, and articles of manufacture, including computer program products, are provided for integration of image and text using Fourier sublayers for accessing one or more software applications. In one aspect, there is provided a system. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method. The computer-implemented method includes receiving, by one or more processors, pairable data including text data and image data, generating, by the one or more processors, text tokens and image encodings from the pairable data, generating, by the one or more processors, embeddings from the text tokens and image encodings, the embeddings including text embeddings and image embeddings, performing, by the one or more processors, a spectral conversion of the text embeddings and image embeddings to generate spectral data, processing, by the one or more processors, the spectral data to extract text-image features, and processing, by the one or more processors, the text-image features to generate inferred answers.

In some variations, one or more features disclosed herein including the following features can optionally be included in any feasible combination. The spectral conversion includes applying a Fourier transform to the text embeddings and image embeddings. Generating the image encodings can include: resizing, by the one or more processors, the image data as resized images, and encoding, by the one or more processors, the resized images using an image encoder. The image encoder includes a region feature approach, a grid feature approach, or a patch projection approach. The patch projection approach includes: extracting, by the one or more processors, a plurality of patches from each of the resized images, and flattening, by the one or more processors, the plurality of patches to generate the image tokens. Processing the spectral data includes: selecting, by the one or more processors, a real part of the spectral data, performing, by the one or more processors, a skip connection addition and a normalization on the real part of the spectral data to generate added and normalized spectral data, and processing, by the one or more processors, the added and normalized spectral data using a feed-forward layer to extract the text-image features. Processing the extracted text-image features includes: adding, by the one or more processors, a prediction head to infer results, and determining, by the one or more processors, correlation results given the text data and the image data.

Another general aspect includes a non-transitory computer-readable storage medium coupled to one or more processors and having instructions stored thereon which, when executed by the one or more processors, cause the one or more processors to perform operations including: receiving pairable data including text data and image data, generating text tokens and image encodings from the pairable data, generating embeddings from the text tokens and image encodings, the embeddings including text embeddings and image embeddings, performing a spectral conversion of the text embeddings and image embeddings to generate spectral data, processing the spectral data to extract text-image features, and processing the text-image features to generate inferred answers.

Another general aspect includes a system that includes at least one programmable processor. The system also includes a non-transitory machine-readable medium storing instructions that, when executed by the at least one programmable processor, cause the at least one programmable processor to perform operations that include: receiving pairable data including text data and image data, generating text tokens and image encodings from the pairable data, generating embeddings from the text tokens and image encodings, the embeddings including text embeddings and image embeddings, performing a spectral conversion of the text embeddings and image embeddings to generate spectral data, processing the spectral data to extract text-image features, and processing the text-image features to generate inferred answers.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the present disclosure are generally directed to image-text integration. More particularly, implementations of the present disclosure are directed to a deep learning model that replaces self-attention sublayers with Fourier sublayers to integrate the information from image and text sources. The Fourier sublayers can perform an algorithm (e.g., Fast Fourier Transform) to convert text and image inputs from time domain to spectral domain. Information from spectral and time domains can be processed to enable integration of information from the image and text inputs without introducing any additional trainable parameter.

Existing image-text deep learning models generally use self-attention sublayers in connecting the information from image and text modalities. A disadvantage of traditional image-text integration is associated to the use of self-attention sublayers with N-quadrate complexity, which lead to an increase in quadratic memory and processing complexities that increase with the size and resolution of input texts and images. In contrast, the image-text integration method described herein improves the processing efficiency by replacing the cumbersome self-attention sublayers with more processing efficient Fourier sublayers with loglinear complexity. The usage of Fourier sublayers for image-text integration provides an advantage of preventing an increase in quadratic complexities that occur in self-attention sublayers. Another advantage of the image-text integration method described herein is that accurate results can be obtained without introducing any trainable parameters in the Fourier sublayers, therefore having a smaller number of parameters than the traditional models. The result accuracy of the proposed model can be equal to or greater than the result accuracy of traditional image-text analysis models that use self-attention sublayer. The efficiency introduced by the model described herein can benefit real-world applications when the image-text model is to be deployed in user devices with limited or no access to supercomputers in making the prediction, or machines with limited computational capabilities. Examples of real-world applications implemented on user devices with limited processing capabilities include fine-tuning text-image matching for image retrieval in response to text queries defining searched objects (defined by text strings). Additionally, because the model described herein does not suffer from quadratic complexity, it can process significantly longer text sequences and higher image resolution without exhausting memory usage and runtime of user devices with limited processing capabilities.

Figure 1:
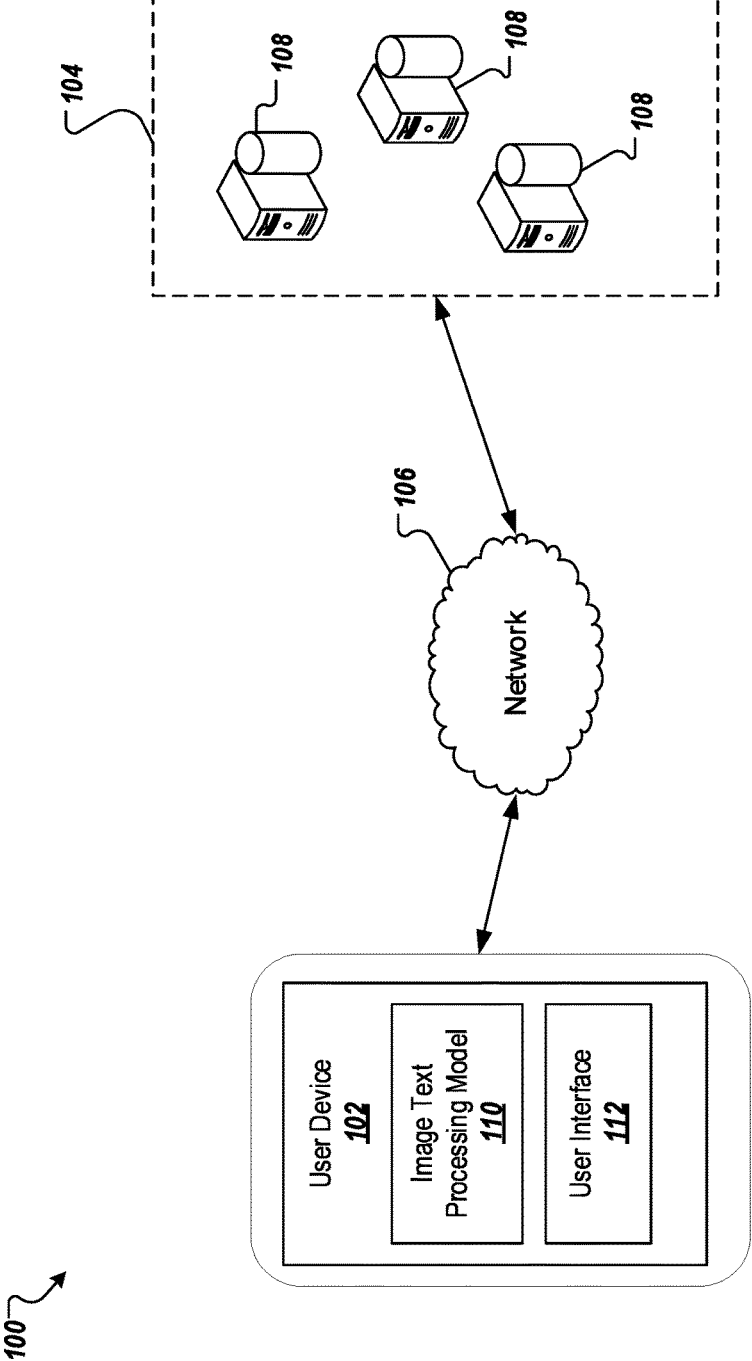
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more user devices 102, a server system 104 and a network 106. The server system 104 includes one or more server devices 108.

In some examples, the user device 102 can communicate with one or more of the server devices 108 over the network 106. In the depicted example, the user device 102 includes an image text processing model 110 configured to process received data (e.g., image and text data) and a user interface 112 that enables receipt of user input and display of results for a user. The image text processing model 110 can interact with an application that is hosted by the server system 104 to retrieve or receive data (e.g., image and text data) from the one or more server devices 108. The image text processing model 110 can transmit image text processing results to the one or more server devices 108.

In some examples, the user device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. The user device 102 can include one or more cameras, sensors, and/or input/output ports, to receive images to be paired with text. The user device 102 can include one or more microphones and/or input/output ports to receive text that is pairable with images.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of user devices (e.g., the user device 102) over the network 106.

In accordance with implementations of the present disclosure, the server system 104 can also host an image text processing service (e.g., provided as one or more computer-executable programs executed by one or more computing devices). For example, input data can be provided to the server system (e.g., from the user device 102), and the server system can process the input data through the image text processing service to provide result data. For example, the server system 104 can send the result data to the user device 102 over the network 106 for display to the user on the user interface 112.

Implementations of the present disclosure are described in detail herein with reference to an example context. The example context includes analysis of data including textual data and image data. Example data can include any types of image-text pairs. Example image data include, without limitation, images of known objects, locations, or living beings, such as restaurants, hotels, airlines, food, beverage, theater, products, and services. Example text data can capture reviews, descriptions, and/or information associated with the respective images. As another example, text data can capture user reviews of a product. In some examples, users can submit tens, hundreds, thousands of reviews using, for example, third-party services (e.g., submit reviews to a third-party review service, or online retailer (application; website)), and/or to an application/website of a provider (of the reviewed products/services)). It is contemplated, however, that implementations of the present disclosure can be realized in any appropriate context.

Figure 2:
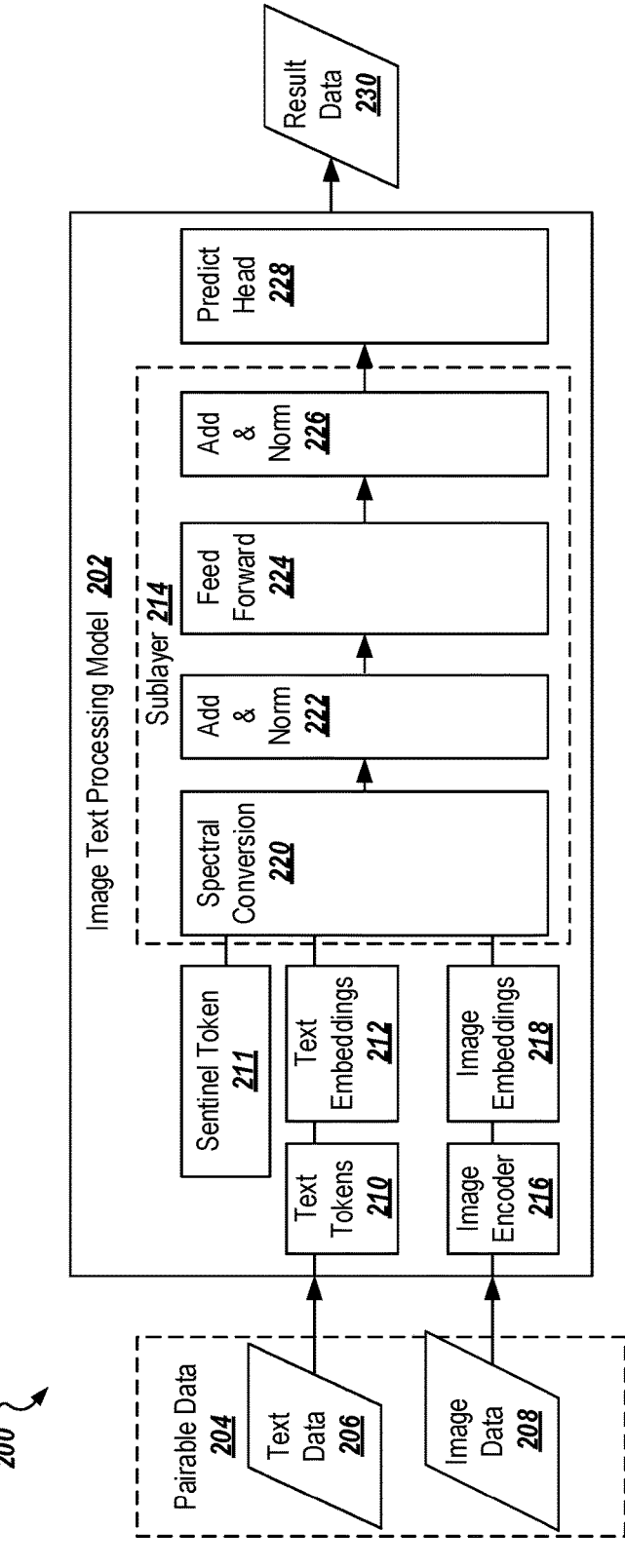
FIG. 2 a flow diagram illustrating the operations of an example of an image and text integration model, in accordance with some example implementations.

FIG. 2 illustrates example operations 200 for image-text matching using an image and text integration model 202 that can be integrated in a user device (e.g., user device 102, described with reference to FIG. 1) or another computing device with limited processing capabilities, in accordance with some example implementations. In an illustrative example, an image and text integration model 202 defines a set of regions in each image of a dataset including multiple images. The image and text integration model 202 can process each region of an image that depicts one of multiple different objects (e.g., a reference object, a building, and a person) to identify a matching text with a high degree of confidence and can aggregate the results for all regions to generate a text-image pairing result matching an entire image. For each region, the image and text integration model 202 generates an input embedding representative of the region. The input embedding identifies one or more visual characteristics of the region and a position of the region within the image. In the current example, an input embedding of a region representing the building includes characteristics of the object, such as a size or shape of the building (e.g., an image token embedding) and that the building is located relative to a reference object (e.g., a position embedding). In some instances, the input embedding of the region includes an identifier usable to distinguish the region from other regions of the image (e.g., a segment embedding). Continuing with the provided example, the image and text integration model 202 can apply a spectral transformer encoder to the input embedding to generate an intra-modality representation of the region. The intra-modality representation identifies an image object depicted in the region, in which the image object can be identified based on the spectral transformer encoder processing one or more other regions of the set of regions. The identified object can be matched with a descriptive text, such that (within the context example, a match of a text string "building" would correctly match (with high confidence level) the region of the image illustrating a building and a match of a text string "building" would incorrectly match (paired being defines as having a low confidence level) the region of the image illustrating a person. The spectral transformer enables processing of large data sets on the user device with limited computing capabilities. Some examples of large-scale captioning datasets that can be processed by the image and text integration model 202 of the user device include: Microsoft® Common Objects in Context (MSCOCO), English Wikipedia (EW) and Visual Genome (VG), images with captions (e.g., Stoney Brook University (SBU) Captions, and Google® Conceptual Captions (GCC)).

The image and text integration model 202 in the example embodiments employ a spectral (fast Fourier transform) layer of processing based on deep learning models. The deep learning models may be based on neural network (NN) models. The NNs learn to perform tasks without being programmed with task specific rules. The parameters of the image and text integration model 202 can be optimized through a training process. Different training processes may be used for a NN including supervised training and unsupervised training. In a supervised training process, both the input and the output of the model can be provided and the NN can process the input data based on the model parameters and may compare the output results with the desired outputs. Errors can be propagated back to adjust the weights used to control the NN. The data set that is used for training can be a small portion of the large dataset that needs to be processed and can be processed multiple times to refine the weights associated with the image and text integration model 202. With the unsupervised training, the NN may be provided with the input (also referred to as unlabeled data) and not with the desired outputs. The NN may adjust its parameters through self-organization and adaptation processes. Another example of training mechanisms may be self-supervised training which comprises an unsupervised pre-training step followed by one or more supervised training steps. In some implementations, the NNs may be categorized into feedforward neural network and recurrent neural networks (RNNs). The feedforward NN may comprise an input layer, one or more hidden layers and an output layer. The number of the hidden layers determine the depth of the NN. With feedforward NN, the information may move in one direction from the input layer through the hidden layer(s) and to the output layer. In RNNs, the information may move in both directions (e.g., in the direction of input layer to the output layer or vice versa). Example embodiments in this disclosure may use a feedforward neural network as a processing layer.

The image and text integration model 202 can receive pairable data 204 including text data 206 (e.g., continuously received real-time text values, text strings, such as questions in natural text) and respective image data 208. The pairable data 204 can have different formats, in which each text data 206 can be paired to a respective image data 208. The pairable data 204 can be structured into potential pairs, for which a result, including a correlation estimate is generated. The potential pairs can be transmitted to the image and text integration model 202 to generate a binary prediction given a text statement and potentially pairable images. For example, a triplet input (text, image1, image2) can be reformulated into two pairs: (text, image1) and (text, image2). Each text-image pair can be processed by the image and text integration model 202 to predict a correlation estimate that is used to determine whether is true or false that a natural text statement matches each of the potentially pairable images at a time. The image and text integration model 202 can process pairable data 204 including a large-scale captioning dataset.

The image and text integration model 202 can categorize the received text data 206 to generate text embeddings 212 by tokenizing the text data 206 and converting the tokenized text data 210 into text embeddings 212 using a vocabulary model (e.g., Sentence Piece vocabulary model). For example, tokenized text data 210 may be converted to text embeddings 212 (a vector of real numbers) through a process referred to as word embedding process. The text embeddings 212 can be added by the absolute position embedding of each text token 210, resulting in combined text (T) embeddings $T \in R^{L \times H}$, where R is the real number, L is a pre-determined maximum length of the text sequence and H is a hidden size of the text. The text embeddings 212 can include word embeddings, and position embeddings. The text embeddings 212 can be initialized from a pre-trained database with a set hidden size (e.g., H=768) that can be selected based on a size of the pairable data and/or processing capability of a user device performing the process.

The image and text integration model 202 can process the image data 208 by reformatting the images. Reformatting of the image data 208 can include image resizing and position encoding. For example, a shorter edge and a longer edge of the input images in the image data 208 can be resized to set sizes (set numbers of pixels) while preserving aspect ratio to generate image patches. The reformatted images can be processed using image encoder 216 into image embeddings 218. The images embeddings 218 can include characteristics of objects within an image.

The image encoder 216 can include approaches based on any of a region feature approach, a grid feature approach, and a patch projection approach. The region feature model can leverage off-the-shelf object detector such as Faster R-CNN. During training, image features can be pre-extracted to speed up training time. The pre-extraction process can create a limitation to perform data augmentation and tuning the image embedding 218 during the image-and-text pre-training. During inference, image processing includes extraction of the image features, such as region proposal and non-maximum suppression. The grid feature models can generate an output feature grid of convolutional neural networks that are flattened and directly used as the input tokens to the modality interaction transformer. The grid feature models can also use transformer-based image encoder, which reformats the image data 208 into image patches of dimension P of a set number of pixels (e.g., 16) pixels and process the patches using a transformer model to give the input tokens to the modality interaction transformer. The patch projection approach can be configured to embed images using simple projection operations, resulting in up to tens of times of runtime speedup compared to other image embedding models, yet with competitive downstream tasks performance. During pre-training, a random sample of a set number of image patches can be used. The image embeddings 218 including the position encoding can be interpolated to fit the size of each image and pad the patches for batch processing.

The image embeddings 218 can be mapped into a same dimension as the dimension H of the text embeddings 212.

With the same depth and hidden size, the sublayer 214 is more efficient than the traditional self-attention sublayer. Therefore, a larger image encoder 216 can be determined given computational and memory budgets for the image and text integration model 202.

The sublayer 214 can be configured to perform a spectral conversion 220 to text embeddings 212, image embeddings 218, and sentinel token 211. The sentinel token 211 can be processed to capture a pooled representation of the text embeddings 212 and image embeddings 218. The spectral conversion 220 can allow the routing of information between the text embeddings 212, image embeddings 218, and sentinel token 211 without introducing additional model parameter. The spectral conversion 220 can include an algorithm that can convert spatial domain data to spectral (frequency) domain data, such as a Fast Fourier Transform (FFT) algorithm that can be one dimensional or multidimensional. The spectral conversion 220 can be configured to perform a 1D FFT along the hidden dimension, followed by another 1D FFT along the sequence dimension for the routing of information. The spectral data can be configured such that only the real part is extracted, followed by skip connection addition and normalization 222. Skip connection addition can include an addition operation between the output of a function (e.g., the spectral conversion 220) and the function's input itself. A feed-forward layer 224 can be used to extract useful blended image-text features. The outputs from the feed-forward layer 224 can be followed by the skip connection addition and normalization 216 and used as inputs to the subsequent sublayer 214, repeated k times (e.g., 12).

To generate inferred answers, sublayer 214 can add a prediction head 228 composed of a feed-forward network. The input to the prediction head 228 can be the processed sentinel token 211, which contains pooled information from the text data 206 and the image data 208. The result data 230 can include a classification of pairs of images and text data (sentences) as matches with determined confidence levels or as correct or incorrect matches. For example, a text string (e.g., caption) can be identified as corresponding to a particular image with a determined probability that can be compared to a threshold to be converted to a binary correlation indicator. A positive correlation indicator can indicate predicted pairs of texts and images. The negative indicator can indicate incorrect pairs of texts and images. The prediction head can also be configured such that results data 230 is suited for other image-and-text tasks, such as answering a text question given an image and retrieval tasks.

Figure 3:
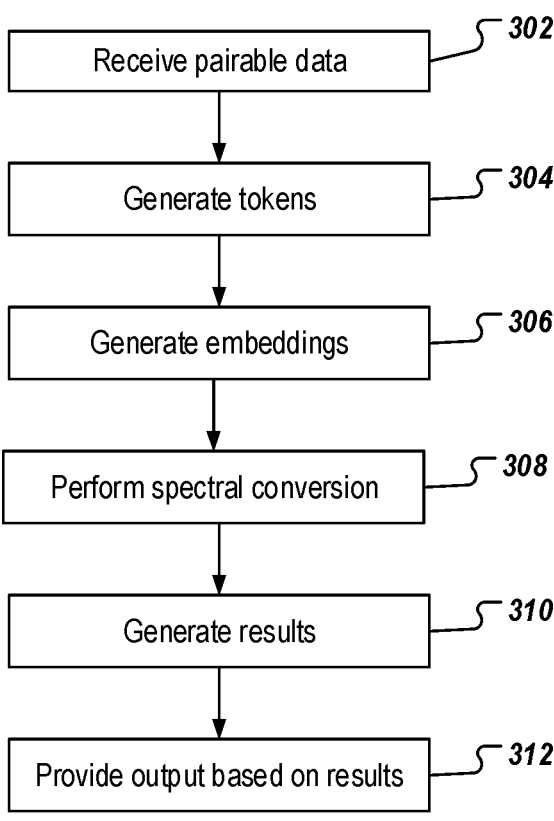
FIG. 3 depicts a flowchart illustrating an example of a process for image and text integration, in accordance with some example implementations.

FIG. 3 depicts an example process 300 for image-text matching, in accordance with some example implementations. The example process 300 can be executed by a computing device, such as the user device 102 described with reference to FIG. 1 or a different computing device with limited processing capabilities.

At 302 pairable data and a question referring to the pairable data are received. The pairable data and the question can be received by a computing system, such as a user device (e.g., user device 102 described with reference to FIG. 1). The question can refer to an image and a text of the pairable data that could be processed by an image and text integration model (e.g., image and text integration model 110 described with reference to FIG. 1 or image and text integration model 202 described with reference to FIG. 2). The pairable data can include text data (e.g., text strings, such as questions in natural text) and image data that could be potentially matched with the text data based on determined confidence levels. The text data can include text strings, such as questions in natural text or documents including text strings. The documents can include structured documents. A structured document can include a plurality of pre-defined fields. Examples of structured documents may include standardized forms. The input text tokens may be derived from the document based on the pre-defined fields. In some implementations, the document can include a plurality of pre-defined fields, wherein the text tokens are derived from the plurality of pre-defined fields. According to an embodiment, the document may be an unstructured document. In an unstructured document, the information may appear in nondeterministic places within the document. The images can be images captured by a camera of the user device, images pre-stored by the user device or images received by the user device from an external source.

The pairable data can have different formats, in which each text data type can be paired to one or more image data. The pairable data can be automatically structured, by the user device, into potential pairs, for which a result, including a correlation estimate can be generated by the output image text processing module 202. For example, a triplet input including a text string (text) and two images (image1, image2) illustrating different objects can be reformulated into two pairs: (text, image1) and (text, image2). Within a context example, pairable data can be retrieved based on a user input. For example, if a user input includes a query requesting identification of one or more images including an object defined by a text string, the pairable data includes the text string and images stored or acquired by the user device that have to be analyzed in accordance with the user defined criteria.

At 304 tokens and encodings are generated, by the image and text integration model (e.g., image and text integration model 110 described with reference to FIG. 1 or image and text integration model 202 described with reference to FIG. 2). The text and images from each text-image pair can be categorized to generate text tokens and image encodings. For example, the text can be reformatted using a Sentence-Piece model to generate text tokens including sentences formed of multiple pieces. The image data from different text-image pairs can have different sizes and resolutions. The image data from each text-image pair can be reformatted by resizing the images and by encoding the resized image. The image encoder can include approaches based on any of a region feature approach, a grid feature approach, and a patch projection approach. The region feature model can leverage off-the-shelf object detector such as Faster R-CNN. During training, image features can be pre-extracted to speed up training time. The pre-extraction process can create a limitation to perform data augmentation and tuning the image embedding during the image-and-text pre-training. During inference, image processing can include extraction of the image features, such as region proposal and non-maximum suppression. The grid feature models can generate an output feature grid of convolutional neural networks that are flattened and directly used as the input tokens to the modality interaction transformer. The grid feature models can also use transformer-based image encoder, which reformats the image data 208 into image patches of dimension P of a set number of pixels (e.g., 16) pixels and process the patches using a transformer model to give the input tokens to the modality interaction transformer. The patch projection approach can be configured to embed images using simple projection operations, resulting in up to tens of times of runtime speedup compared to other image embedding models, yet with competitive downstream tasks performance. For example, using the patch projection approach, a shorter edge and a longer edge of the input images in the image data can be resized to set sizes (set numbers of pixels) while preserving an aspect ratio to generate image patches of set sizes and a set resolution, uniform across all text-image pairs, without overlaps. The image patches can be flattened (converting a 2 dimensional pixel value vector to a 1 dimensional pixel value vector) to be used as image tokens.

At 306, the tokens are converted into embeddings. The tokenized text data can be converted into text embeddings using a vocabulary model (e.g., Sentence Piece vocabulary model). The text embeddings can be added by the absolute position embedding of each text token, resulting in combined text (T) embeddings $T \in R^{L \times H}$, where R is the real number, L is a pre-determined maximum length of the text sequence and H is a hidden size of the text. The text embeddings can include word embeddings and position embeddings. The text position embeddings can be used to retain the positional information of the original text. The text embeddings can be initialized from a pre-trained database with a set hidden size that can be selected based on a size of the pairable data and/or processing capability of a user device performing the process.

The image data can be converted into image embeddings using a grid feature approach. For example, the image data can be processed by using a transformer-based image encoder to get images embeddings $V \in R^{N \times HV}$, where N is the number of patches used as tokens. The image encoder can be initialized with a pre-trained distilled transformer-based image encoder, which uses a patch dimension P of a set number of pixels (e.g., 16) pixels and hidden size HV (e.g., HV=384). The image embeddings can be mapped into a same dimension as the dimension H of the text embeddings. The images embeddings including the position encoding can be interpolated to fit the size of each image and pad the patches for batch processing. The images embeddings can include position embeddings that can be linearly added to the sequence of tokens (image patches) to retain the positional information of the original images. The images embeddings can include information about the relative or absolute position of the image patches in the sequence of tokens. The size of the image encoder can be determined such that the runtime and memory overhead of the architecture is comparable to a lightweight image-and-text transformer (e.g., patch projection approach). The addition of the image encoder in the image and text integration model is possible since the sublayer is more efficient than a self-attention sublayer in a lightweight image-and-text transformer.

At 308 spectral conversion is performed on the text and image embeddings as well as the sentinel token. The spectral conversion can include an algorithm that can convert spatial domain data to spectral (frequency) domain data (e.g., the sublayer 214 can be configured to perform a spectral conversion 220, as described with reference to FIG. 2) to route the information between the text embeddings, image embeddings, and sentinel token. The algorithm can include a Fast Fourier Transform (FFT) algorithm that can be one dimensional, two dimensional, or other dimensional.

At 310 results are generated by processing features from the blended image and text information. Processing image-text features can include taking the real part of the spectral data, performing skip connection addition and normalization, and extracting useful blended image-text features using a feed-forward layer. The processed image-text features can be passed into a prediction head to give the desired results.

The results can include inferred answers answering text questions to given reference images, and enable retrieval tasks. The inferred answers can add a highly correlated text to a corresponding image. The results can be formatted as a classification task predicted by a visual question answering head composed of a feed-forward network. The input to the visual question answering head can include the processed sentinel token containing a pooled text-image information. In some implementations, processing the text and image data can include performing a backward pass for a limited batch size (e.g., of 16, 32 or 64 text-image pairs), after determining text-image correlations and accumulating correlation gradients from the pairable data samples. The results can be formatted as binary results including true (1) or false (0) values for each text-image pair or as confidence levels that may be associated with each text-image pair. The results can indicate whether the input text (a natural text statement) is truly correlated (correctly paired) with each of the potentially pairable images. For each text-image correlation above a set threshold the respective pair can be identified as truly correlating and for each text-image correlation below a set threshold the respective pair can be identified as not (or insufficiently) correlating. In some implementations, a single text-image pair (with the highest correlation coefficient) can be selected as a correct pair (for each type of text) and the remaining pairs are marked as incorrect.

At 312, the results are provided as output. For example, a portion of the (highest text-image correlating) results can be provided as output for display on a user interface of the user device. In some implementations, a portion of the (highest text-image correlating) results can be compared to security data (e.g., a user input or a sensor input associated with a request to access secure data) and a result of the comparison can be used to provide or block access to a service provided by the user device or a function of the user device. For example, if a user device requests a user input to match a randomly generated text with an image and the user input does not match the automatically determined text-image match, an access to a secure service can be prevented by modifying a function of the user device. As another example, if the user device requests a user input (image capture) matching an object described by a text string and the user input does not match the automatically determined text-image match, an access to a secure service can be prevented by modifying a function of the user device (e.g., interrupting a communication connection, disabling a control button, etc.). As another example, user devices with limited processing capabilities can display results of fine-tuning text-image matching for image retrieval in response to text queries defining searched objects (defined by text strings). Additionally, because the model described herein does not suffer from quadratic complexity, it can process significantly longer text sequences and higher image resolution without exhausting memory usage and runtime of user devices with limited processing capabilities.

The example process 300 was tested against an image-and-text transformer with patch projection image encoding. The image-and-text transformer with patch projection image encoding was selected as baseline due to the similar light-weight nature to the example process 300. The image-and-text transformer with patch projection image encoding and the model in example 300 were pre-trained with MSCOCO dataset including 567K image-text pairs with 113K images. The example 300 requires 56.7 M parameters for the 12 image-text integration layers with a hidden dimension of 768, whereas the baseline model requires 87.5 M parameters. A transformer-based image encoder with 22.4 M parameters is used for the image encoding of example process 300. The example process 300 was evaluated based on two common text-image classification downstream tasks: visual question answering (VQA) and natural text for visual reasoning (NLVR). VQA configures the model to answer questions given pairs of images and questions in natural text. The task can be converted into a classification task with 3,129 answer classes. NLVR is a binary classification task for which the model can predict whether a natural text statement about a pair of images is true or false.

The example process 300 used the same optimizer as the baseline image-and-text transformer for all experiments (e.g., AdamW optimizer) with base learning rate of $10^{-4}$ and weight decay of $10^{-2}$. The learning rate was warmed up for 10% of the total training steps and was decayed linearly to zero for the remaining steps. The pre-training follows image-text matching and masked language modelling strategies as commonly used for image-and-text transformer. In image-text matching, the model needs to classify given pairs of images and sentences as correct or incorrect matches. To this end, an image corresponds to a caption is replaced with an arbitrary image with a probability of 0.5. A learned image-text matching prediction head projects the processed sentinel token to predict the correct or incorrect pairs. In masked language modelling, the model is presented with presented with image-text input pairs where some text tokens have previously been masked with a probability of 0.15. A learned masked language prediction head needs to predict the missing tokens.

To generate inferred answers for VQA task, a VQA prediction head composed of two layers of feed-forward network was added. The input to the VQA head was the processed sentinel token which contains the pooled information from the text and image inputs.

To generate the inferred answers for NLVR task, the triplet input is reformulated into two pairs: (text, image1) and (text, image2). Each input pair was first fed into the example process 300 and the baseline image-and-text transformer model. Then, the NLVR head took the concatenation of two processed sentinel tokens from each pair and generate the binary prediction.

The example process 300 based on the Fourier Transform token mixing strategy has a comparable performance for binary predictions, as shown in NLVR results and does not degrade as much for yes/no category in VQA. The example process 300 may identify when, for example, one image depicts more certain object (e.g., lion) count than the other image as the higher object appearance will propagate stronger "signal," resulting in a comparable performance with the baseline for NLVR dataset.

Figure 4:
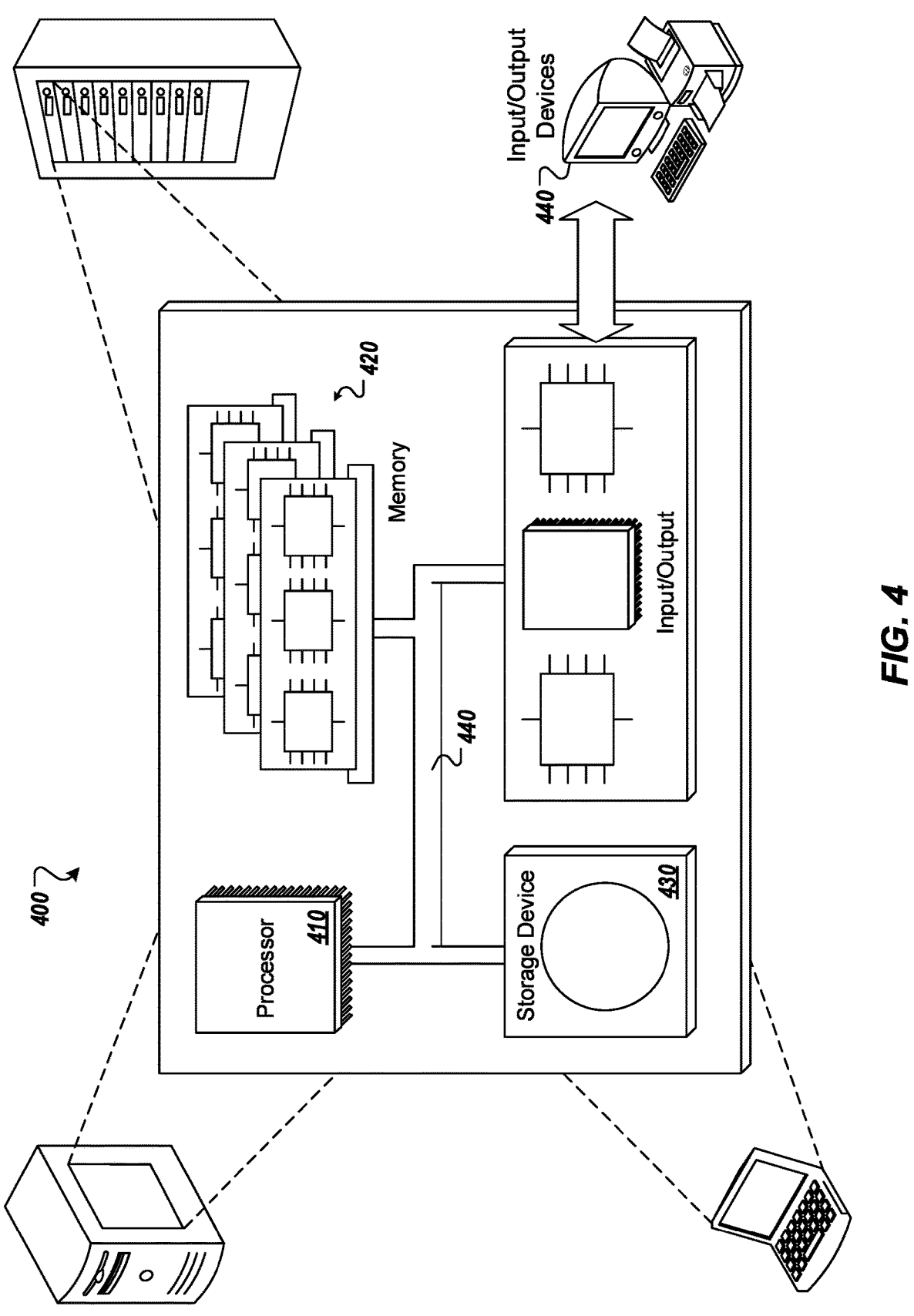
FIG. 4 depicts a block diagram illustrating a computing system, in accordance with some example implementations.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a user computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include users and servers. A user and server are generally remote from each other and typically interact through a network, such as the described one. The relationship of user and server arises by virtue of computer programs running on the respective computers and having a user-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

receiving, by one or more processors, pairable data comprising text data and image data;

generating, by the one or more processors, text tokens and image encodings from the pairable data;

generating, by the one or more processors, embeddings from the text tokens and image encodings, the embeddings comprising text embeddings and image embeddings;

performing, by the one or more processors, a spectral conversion of the text embeddings, the image embeddings, and a sentinel token that captures a pooled representation of the text embeddings and the image embeddings to generate spectral data, wherein the spectral conversion comprises applying a Fourier transform to convert the text embeddings, the image embeddings, and the sentinel token from a time domain to a spectral domain;

processing, by the one or more processors, the spectral data to extract text-image features, wherein the text-image features comprise text information and image information that are blended together; and processing, by the one or more processors, the text-image features in part by predicting correlation values for each of the text-image features to generate inferred answers answering text questions to given reference images, wherein the inferred answers are generated based on particular text-image features having a correlation value exceeding a set threshold.

2. The method of claim 1, wherein generating the image encodings comprises:

resizing, by the one or more processors, the image data as resized images; and encoding, by the one or more processors, the resized images using an image encoder.

3. The method of claim 2, wherein the image encoder comprises a region feature approach, a grid feature approach, or a patch projection approach.

4. The method of claim 3, wherein the patch projection approach comprises:

extracting, by the one or more processors, a plurality of patches from each of the resized images; and flattening, by the one or more processors, the plurality of patches to generate image tokens.

5. The method of claim 1, wherein processing the spectral data comprises:

selecting, by the one or more processors, a real part of the spectral data;

performing, by the one or more processors, a skip connection addition and a normalization on the real part of the spectral data to generate added and normalized spectral data; and processing, by the one or more processors, the added and normalized spectral data using a feed-forward layer to extract the text-image features.

6. A non-transitory computer-readable storage medium coupled to one or more processors and having instructions stored thereon which, when executed by the one or more processors, cause the one or more processors to perform operations comprising:

receiving pairable data comprising text data and image data;

generating text tokens and image encodings from the pairable data;

generating embeddings from the text tokens and image encodings, the embeddings comprising text embeddings and image embeddings;

performing a spectral conversion of the text embeddings, the image embeddings, and a sentinel token that captures a pooled representation of the text embeddings and the image embeddings to generate spectral data, wherein the spectral conversion comprises applying a Fourier transform to convert the text embeddings, the image embeddings, and the sentinel token from a time domain to a spectral domain;

processing the spectral data to extract text-image features, wherein the text-image features comprise text information and image information that are blended together; and processing the text-image features in part by predicting correlation values for each of the text-image features to generate inferred answers answering text questions to given reference images, wherein the inferred answers are generated based on particular text-image features having a correlation value exceeding a set threshold.

7. The non-transitory computer-readable storage medium of claim 6, wherein generating the image encodings comprises:

resizing the image data as resized images; and encoding the resized images using an image encoder.

8. The non-transitory computer-readable storage medium of claim 7, wherein the image encoder comprises a region feature approach, a grid feature approach, or a patch projection approach.

9. The non-transitory computer-readable storage medium of claim 8, wherein the patch projection approach comprises:

extracting a plurality of patches from each of the resized images; and flattening the plurality of patches to generate image tokens.

10. The non-transitory computer-readable storage medium of claim 6, wherein processing the spectral data comprises:

selecting a real part of the spectral data;

performing a skip connection addition and a normalization on the real part of the spectral data to generate added and normalized spectral data; and processing the added and normalized spectral data using a feed-forward layer to extract the text-image features.

11. A system comprising:

a computing device; and a computer-readable storage device coupled to the computing device and having instructions stored thereon which, when executed by the computing device, cause the computing device to perform operations comprising:

receiving pairable data comprising text data and image data;

generating text tokens and image encodings from the pairable data;

generating embeddings from the text tokens and image encodings, the embeddings comprising text embeddings and image embeddings;

performing a spectral conversion of the text embeddings, the image embeddings, and a sentinel token that captures a pooled representation of the text embeddings and the image embeddings to generate spectral data, wherein the spectral conversion comprises applying a Fourier transform to convert the text embeddings, the image embeddings, and the sentinel token from a time domain to a spectral domain;

processing the spectral data to extract text-image features, wherein the text-image features comprise text information and image information that are blended together; and processing the text-image features in part by predicting correlation values for each of the text-image features to generate inferred answers answering text questions to given reference images, wherein the inferred answers are generated based on particular text-image features having a correlation value exceeding a set threshold.

12. The system of claim 11, wherein generating the image encodings comprises:

resizing the image data as resized images; and encoding the resized images using an image encoder.

13. The system of claim 12, wherein the image encoder comprises a region feature approach, a grid feature approach, or a patch projection approach, wherein the patch projection approach comprises:

extracting a plurality of patches from each of the resized images; and flattening the plurality of patches to generate image tokens.

14. The system of claim 11, wherein processing the spectral data comprises:

selecting a real part of the spectral data;

performing a skip connection addition and a normalization on the real part of the spectral data to generate added and normalized spectral data; and processing the added and normalized spectral data using a feed-forward layer to extract the text-image features.

* * * * *